Nov. 29, 1966  A. P. WATERSON  3,287,835
LAND LEVELER
Filed March 23, 1964  3 Sheets-Sheet 1
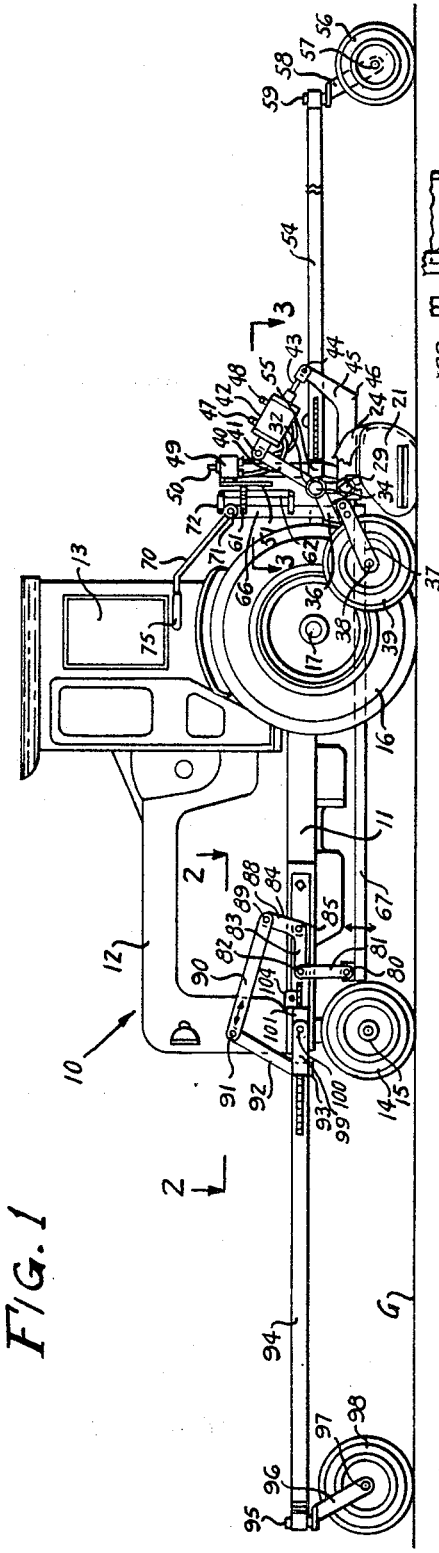
FIG. 1
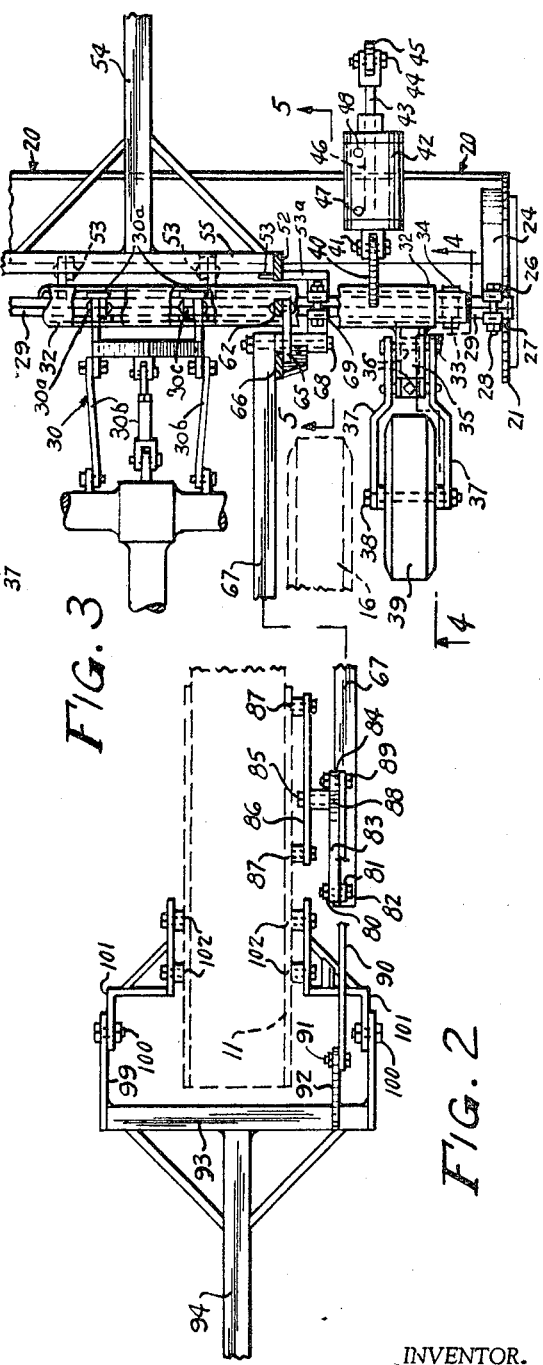
FIG. 3
FIG. 2
INVENTOR.
ARTHUR P. WATERSON
BY *Kimmel, Crowell & Weaver*
ATTORNEYS.

Nov. 29, 1966 A. P. WATERSON 3,287,835
LAND LEVELER
Filed March 23, 1964 3 Sheets-Sheet 2
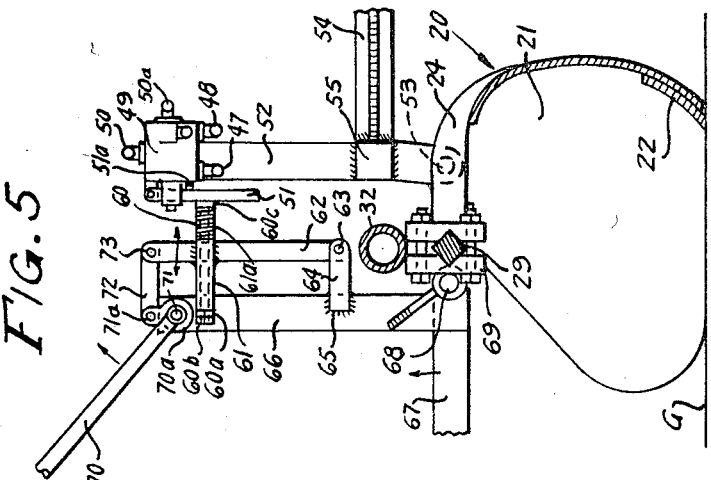
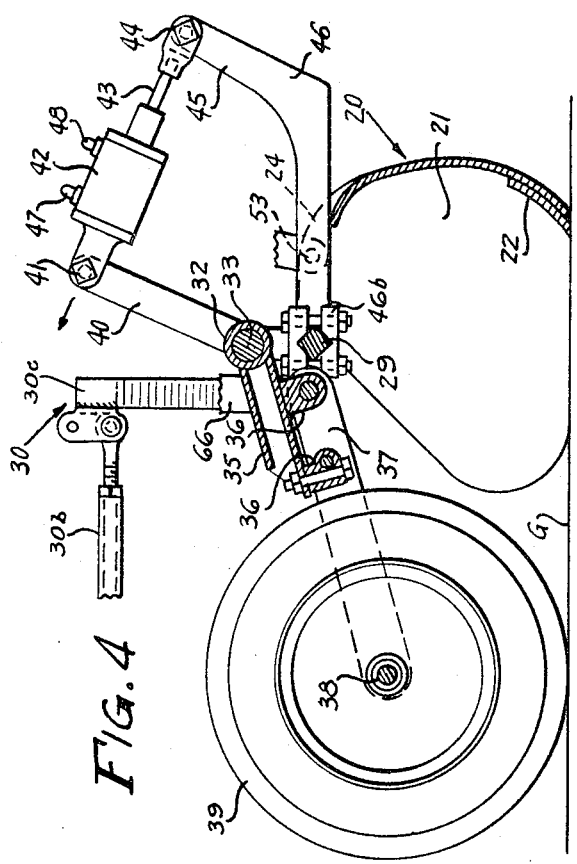
INVENTOR.
ARTHUR P. WATERSON
BY Kimmel, Crowell & Weaver
ATTORNEYS.

Nov. 29, 1966 A. P. WATERSON 3,287,835
LAND LEVELER
Filed March 23, 1964 3 Sheets-Sheet 3
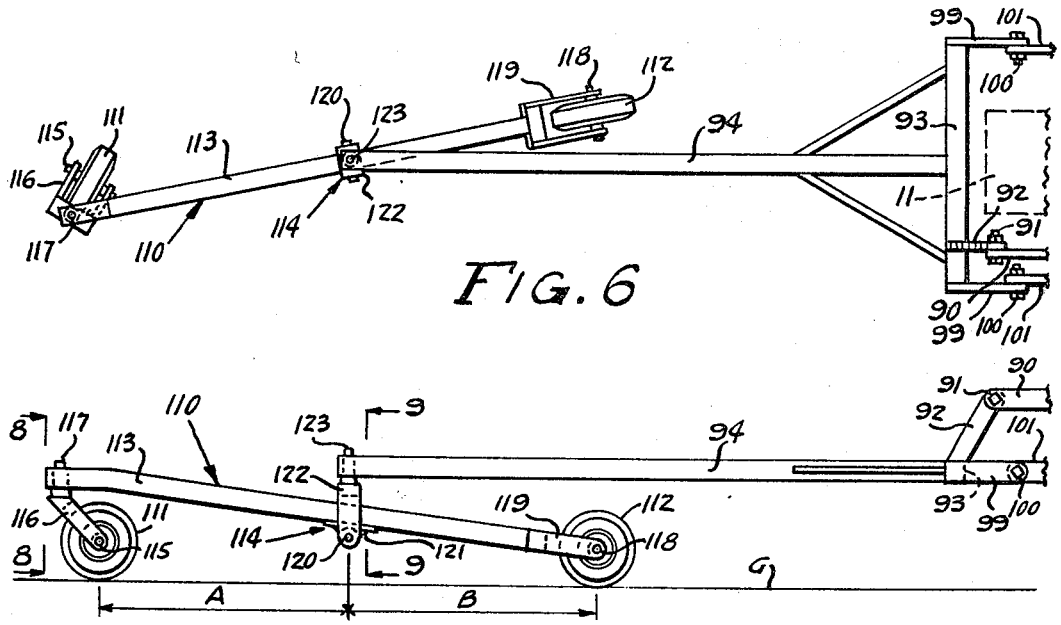
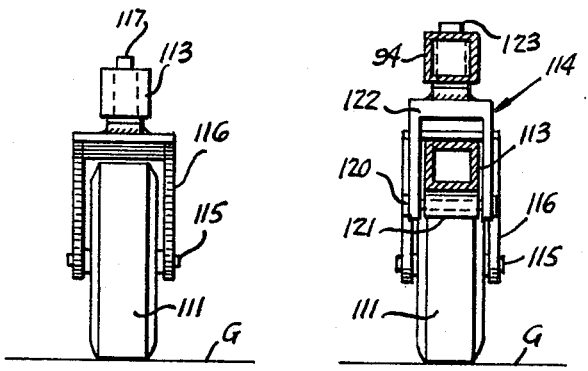
INVENTOR.
ARTHUR P. WATERSON
BY
Kimmel & Crowell
ATTORNEYS.

United States Patent Office

3,287,835
Patented Nov. 29, 1966

3,287,835
LAND LEVELER
Arthur P. Waterson, P.O. Box 415, Dighton, Kans.
Filed Mar. 23, 1964, Ser. No. 354,052
2 Claims. (Cl. 37—180)

This invention relates to a land leveler or the like having forwardly and rearwardly extending feeler elements each carrying ground-engaging wheel means with earth-cutting means operatively connected by control means to the feeler elements for raising and lowering the earth-cutting means in response to upward and downward movement of the wheel means and constitutes an improvement over my prior patents entitled "Land Leveler," Nos. 3,034,239 and 3,103,078 and my prior applications entitled "Land Leveler," Serial Nos. 275,138, filed April 23, 1963 now Patent No. 3,159,929, and 319,829, filed October 29, 1963 now Patent No. 3,210,871, this application being a continuation-in-part of the former copending application.

A primary object of this invention is the provision of a modified wheel means on either or both of the feeler elements of a device of the type described which reduces the size of irregularities remaining in a given area after the same has been leveled.

Another object of this invention is to provide a modified wheel means on the front feeler element of a land leveling device since this element encounters more uneven ground than does the rear feeler element, the modification reducing by approximately 50% the small irregularities caused by upward and downward movement of the wheel means thereby producing a smoother finished area.

A further object of this inveniton is to provide a more accurate and efficient leveling operation due to an elongation of the feeler elements while maintaining the turning radius of the over-all device substantially the same by securing the modified wheel means to the feeler elements about a vertical pivot means thereby enabling the wheel means to turn more sharply causing a foreshortening of the same.

Other and further objects reside in the combination of elements, arrangement of parts and features of construction.

Still other objects will in part be obvious and in part be shown in the accompanying drawings wherein:

FIGURE 1 is a side elevational view of one form of land leveler to be modified in accordance with the instant invention, shown as attached to a conventional tractor with parts broken away for illustrative clarity;

FIGURE 2 is a fragmentary enlarged top plan view taken substantially along the line 2—2 of FIGURE 1, as viewed in the direction indicated by the arrows, the tractor frame being indicated in dotted lines;

FIGURE 3 is an enlarged fragmentary sectional view, with parts thereof being broken away, taken substantially along the line 3—3 of FIGURE 1, as viewed in the direction indicated by the arrows;

FIGURE 4 is an enlarged fragmentary detailed sectional view taken substantially along the line 4—4 of FIGURE 3, as indicated by the arrows, with parts broken away for illustrative clarity;

FIGURE 5 is an enlarged fragmentary sectional view, taken substantially along the line 5—5 of FIGURE 3, as viewed in the direction of the arrows;

FIGURE 6 is a fragmentary top plan view of the forwardly extending feeler element carrying a modified wheel means in accordance with the instant inventive concept, the wheel means being shown as offet slightly as during the beginning of turn;

FIGURE 7 is a side elevational view thereof, the wheel means being in line with the feeler element as during straightforward movement;

FIGURE 8 is an enlarged front elevational view taken substantially on line 8—8 of FIGURE 7; and FIGURE 9 is an enlarged transverse cross-sectional view taken substantially on line 9—9 of FIGURE 7.

Similar reference characters refer to similar parts throughout the several views of the drawings.

Having reference now to the drawings in detail, there is generally indicated at 10 a conventional tractor or driving means of any desired type which includes a frame 11, motor housing 12, with a control station 13 for the operator. The tractor is provided with steerable front wheels 14 mounted on an axle 15 and rear drive wheels 16 mounted on an axle 17 in a conventional manner.

A land leveler in accordance with my copending application Serial No. 275,138 is comprised of an elongated transverse scraper 20 which is provided with end plates 21 and a cutting edge 22. Support bars 24 fixedly secured to the scraper are in turn secured to a plurality of laterally spaced clamping plates 26 which are held by means of opposed clamping plates 27 and bolts 28 in rigid related assembly with a transverse shaft 29. The shaft 29 is rigidly secured as by clamps 30a or welding to an attachor 30c which carries a conventional three-point hitch 30 which is pivotally connected by links 30b to the tractor frame at the rear thereof so that the blade may be raised or lowered to the relative contour of the ground in a manner to be more fully described hereinafter. A heavy steel tubular lifting roll or sleeve 32 has stubs 33 welded in each end supported on totally enclosed bearings 34 fixed to the shaft 29 for rotation of the lifting roll or sleeve 32 and carries at each end a forwardly extending, downwardly inclined support 35 from which depend fixed lugs 36 to the opposite sides of which are fixedly bolted bracket arms 37 which support axles 38, which in turn, carry oppositely disposed guide wheels 39, the arrangement being such that rotation of the lifting roll or sleeve 32 raises or lowers the guide wheels 39 relative to the scraper blade 22, and consequently, varies the effective level of the scraper blade with respect to the ground level G.

An angularly disposed upwardly extending arm 40 is suitably affixed as by welding to lifting roll or sleeve 32 and is pivotally connected as by means of pivot 41 to one end of a hydraulic cylinder 42. The cylinder 42 contains a conventional piston which is connected to a piston rod 43 which is in turn pivotally connected as by a pivot 44 to the upwardly extending portion 45 of a rearwardly extending L-shaped bracket 46 which is in turn fixedly secured to shaft 29. Fluid is supplied to cylinder 42 through conventional fluid connection conduits 47 and 48 which are controlled by conventional hydraulic valve 49 which is supplied with fluid through a fluid conduit 50 with a return fluid conduit 50a to any suitable conventional source (not shown). Valve 49 has a valve control lever 51 (see FIGURE 5) which selectively directs fluid through conduit 47 or 48 to move piston rod 43 and through arm 40 to rotate lifting roll or sleeve 32 and vary the relative position of guide wheels 39 with respect to scraper 20 and accordingly, raise or lower cutting edge 22.

The valve 49 is mounted on rear upright 52 which is pivotally mounted on a pivot 53 carried by an arm 53a secured to shaft 29. A rearwardly extending feeler element 54 of any desired length is fixedly secured to a plate 55 which is fixed to and movable with the arm 52. Feeler element 54 carries a rear feeler wheel 56 carried on an axle 57 which is supported by a bracket 58 which is weldably mounted to pivot 59 carried by the rear of element 54. The operating lever of control means 51 of valve 49 engages the stop 60, to be more fully described hereinafter. When the arrangement is thus such that as the rear feeler wheel 56 is raised or lowered by the contour of the ground level over which it travels, the relative position of guide wheels 39 is varied relative to the blade 22 to raise or lower the blade and effectively remove humps or irregularities directed by the rear feeler wheel.

The stop 60 is operatively connected to a third upright 62, a matter now to be described, so that the effective height of the blade is governed by the conjoint action of the front and rear feeler elements. Stop 60 is mounted adjustably in a smooth sleeve 61, the adjustment being effected by rotating lock nuts 60a and 60b on a threaded rear portion of the stop 60. A spring 61a presses against head 60c on the stop 60 to bias the same into engagement with the lever 51. The lock nuts 60a and 60b allow a safety factor for valve 49 in case the tractor is operated without pressure to the valve 49. This occurs if the operator turns off the pressure while the wheels leave the leveled field at the turning area or at a corner which may be either below or above the grade. The sleeve is mounted on the third upright 62 which is pivoted as at 63 to a lug 64, the lug being secured at 65 to the front upright 66 which is fixed to a longitudinally extending forward valve control member 67 which in turn is pivoted as at 68 to a support carried at 69 by the shaft 29. The arrangement is thus such that when forward control member 67 is rotated about the pivot 68 in a manner to be described more fully hereinafter, the stop 60 moves toward and away from the valve control lever 51 rather than, as previously described, the valve control lever moving toward and away from a stop. A spring 51a carried by the valve housing 49 biases valve control lever normally toward engagement with stop 60.

Manual control means are provided for varying the position of stop 60 and hence control lever 51 independently of either rear feeler element 54 or front feeler element 94 and takes the form of manual control lever 70 which is pivotally secured as at 71 to the top of front upright 66 and which, through a link 72, serves to move the upper end of the third upright 62 to which it is pivoted by means of a pivot 73 so that the valve control lever 51 may be completely shut off or varied into degrees of movement of the blade assembly in accordance with the dictates of the operator. Suitable friction means such as pressure plate 70a pivoted at 71 and 71a serve to retain manual control handle 70 in any desired adjusted position. As best shown in FIGURE 1, the upper end of control 70 is provided with a handle 75 adjacent the operator's station.

The forward end of forward control member 67 is pivoted by a pivot 80 to a depending link 81 which is pivoted at its other end 82 to a normally horizontal arm 83 of a bell crank lever 84 which is pivoted on the pivot 85 to a plate 86 supported by bolts and spacers 87 on the side of frame 11 of the tractor. A normally upright arm 88 of bell crank member 84 is pivoted as by a pivot 89 to a link 90. The other end of link 90 is in turn pivoted as by a pivot 91 to an inclined arm 92 which is fixed to a crossbar 93 which is secured to the end of the front feeler element 94. The front feeler element 94 carries a swivel 95 which supports the bracket 96 which carries an axle 97 upon which is mounted a front feeler wheel 98. Transverse bar 93, in turn, has rearwardly extending end pieces 99 which are pivoted as by means of pivots 100 to offset bracket arms 101 which are, in turn, secured as by bolts and spacers 102 to the sides of frame 11 adjacent the forward end thereof.

The arrangement is such that the forward feeler wheel 98, upon encountering an irregularity in the ground G, for example, a raised portion, will pivot the front feeler element 94 upwardly on its pivot 100 which in turn rotates the inclined arm 92 in a clockwise direction as seen in FIGURE 1, the inclined arm 92 pushing the link 90 to the right in the direction of the double-headed arrow which in turn rotates the bell crank 84 clockwise about the pivot means 85 thereby rotating the normally horizontal arm 83 of the bell crank which lifts the depending link 81 to raise the front end of the forward control member 67 and thereby tilt the front upright 66 clockwise as seen in FIGURE 5 about the pivot 68 so that the stop 60 is moved toward the valve control means 51 biasing the same against the pressure of the spring 51a to actuate the hydraulic valve 49 for feeding fluid pressure through the flexible conduit 47 to the hydraulic cylinder 42 thereby extending the piston rod 43 which rotates the lifting roll 32 and since the guide wheels 39 are carrying the weight of the scraper 20, this above-mentioned action raises the scraper 20 upwardly to correct the deviation caused by the front feeler wheel 98 traveling onto higher elevation. Similarly, a lowering of the front feeler wheel 98 will operate through the above-described linkage to actuate the hydraulic cylinder 42 to retract the piston rod 43 and thereby lower the scraper 20.

It will also be clear now that the bell crank 84 and other linkage forming part of the front feeler acts to compensate for any movement up or down of the tractor front wheels 14 so that the position of the scraper 20 is only controlled by the relationship of the front and rear feeler wheels 98 and 56, respectively. For example, if the front wheels 14 were raised by encountering an irregularity in the ground G, the rear portion of the front feeler element 94 would be raised accordingly since the pivot 100 is secured to the tractor frame 11. This would in turn raise the inclined arm 92 which is carried by the pivot 100. The bell crank 84 would also be raised since its pivot 85 is secured to the tractor frame 11. The link 90 would be moved upwardly parallel to its original position in view of the raising of both pivots 100 and 85 to rotate the bell crank 84 in a counterclockwise direction as seen in FIGURE 1 about its pivot 85, the end of its normally horizontally extending arm 83 remaining stationary. Since the pivot 82 is not raised or lowered by this action, the depending link 81 is not affected and the forward control member 67 remains stationary so that the front upright 66 and the third upright 62 do not move to actuate the hydraulic valve 49. If, however, at any time during the offset position of the front wheels 14, the forward feeler wheel 98 encounters an irregularity, it will operate as explained hereinabove to actuate the hydraulic valve 49 and thereby move the scraper 20.

Engagement of the rear feeler wheel 56 with an irregularity, such as a raised portion, will pivot the rear feeler element 54 about its pivot means 53 to tilt the rear upright 52 forwardly thereby moving the valve control means 51 of the hydraulic valve 49 into engagement with the stop 60 to feed fluid through the conduit 47 thereby raising the scraper in the same manner as explained hereinbefore on raising of the front feeler wheel 98. Thus, the position of the scraper 20 is actually determined by an average of the positions of the two feeler elements. This will ensure an accurate leveling of the ground surface over a large area.

By positioning a guide wheel 39 in front, and adjacent both ends, of the transverse scraper 20 and the earth which it is carrying or pushing, parallel action of the scraper blade 22 relative to the ground G is ensured. These guide wheels 39 actually carry the weight of the transverse scraper 20 while maintaining alignment of the scraper 20 with the feeler wheels 98 and 56. Moreover, the positioning of the guide wheels forwardly of the load of earth carried by the scraper 20 and near the tractor's drive wheels 16 facilitates in steering of the tractor, while simultaneously maintaining the parallel relationship between the scraper blade 22 and the ground G since each guide wheel 39 carries its end of the transverse scraper 20.

Thus, it will be seen that as the front feeler wheel 98 and the rear feeler wheel 56 pass over an irregularity in the ground G, the earth-cutting means in the form of the scraper 20 is raised or lowered through the actuation of the control means including the valve 49, the hydraulic cylinder 42 and the remainder of the above-described linkage operatively interconnecting the front feeler element 94 and the rear feeler element 54 with the scraper 20. On raising or lowering the scraper 20 in this manner, new mounds or depressions are formed which due to the averaging function of the two feeler elements, are lower than the original irregularities. When the scraper 20 passes over the irregularity in question, it is completely removed due to the fact that the front and rear feeler wheels 98, 56, respectively, maintain the scraper 20 in alignment with the level area of the ground G which they are then engaging. The decrease in the size of the irregularities will depend upon the relative relationship between the lengths of the front and rear feeler elements 94, 54, respectively.

It is well known to those skilled in the land leveling art that it is preferable to have a plurality of relatively small irregularities in a finished area rather than a few relatively large irregularities. The modified construction of the instant invention recognizes this preference and provides the means for reducing the size of the irregularities remaining in relationship to the size of the irregularities originally encountered. An exemplary embodiment of this modified construction is shown in FIGURES 6–9 as attached to the front feeler element 94 of a land leveler such as the one shown in FIGURES 1–5. Parts of the modified embodiment similar to the embodiment shown in FIGURES 1–5 are designated by the reference numerals. The front feeler wheel 98 of the embodiment of FIGURES 1–5 is replaced by a wheel means designated generally by the reference numeral 110 and comprising basically a pair of spaced wheel members 111 and 112 carried at opposite ends of an arm member 113, the arm member 113 being interconnected intermediate its ends with the end of the front feeler element 94 by a pivot means designated generally by the reference numeral 114.

The front wheel member 111 is preferably a caster wheel rotatably mounted on an axle 115 carried by a bifurcated bracket 116 supported by a swivel 117 in a vertical aperture in the front of the arm member 113.

To facilitate steering and operation of the modified wheel means 110, the rear wheel member 112 preferably follows in line with the arm member 113 being mounted on an axle 118 carried by a bifurcated bracket 119.

The pivot means 114 includes a horizontal pivot member 120 rotatably carried by an apertured element 121 fixed to the arm member 113 intermediate the ends thereof for articulation of the arm member 113 thereabout. The horizontal pivot member 120 is carried by a bifurcated bracket 122 which supports a vertical pivot member 123 or swivel means received in the aperture carrying the front feeler wheel 98 of the embodiment of FIGURES 1–5.

The use and operation of the modified construction of the instant invention as shown in FIGURES 6–9 will now be apparent. As either wheel member 111 or 112 engages an irregularity in the ground G, the arm member 113 will be articulated about the horizontal pivot member 120 which in turn will raise the front of the front feeler element 94 thereby actuating the control means to move the scraper 20 as explained hereinabove. However, due to the spacing of the two wheel members 111 and 112, the movement of the front feeler element 94 will not be as great as it would have been had a front feeler wheel such as 98 been carried thereby rather than the wheel means 110. This will in turn decrease the movement of the scraper 20 and thereby decrease the size of the new irregularity formed thereby. The percentage decrease will depend upon the relationship between the dimensions A and B shown in FIGURE 7. If these two dimensions are equal, the irregularities formed due to each wheel member 111 and 112 encountering a mound or depression in the ground G will be approximately 50% of an irregularity which would have been formed had the front feeler element 94 carried a front feeler wheel such as 98 shown in FIGURES 1–5. If the dimension A is twice as long as the dimension B, the irregularity formed by the wheel member 111 will be only one-third as great as with the embodiment of FIGURES 1–5, but the irregularity formed by the wheel member 112 will be two-thirds as great. It is therefore preferable to have the pivot means 114 positioned approximately midway between the extremities of the arm member 113 thereby decreasing the size of the irregularities by approximately 50%. Since this decrease in size of the irregularities is in addition to the decrease caused by the averaging of the front and rear feeler elements 94, 54 explained hereinabove with respect to the embodiment of FIGURES 1–5, the new irregularities will be one-fourth or less as large as the original mound or depression encountered by the wheel means.

The modified construction has been shown in the drawings as particularly applied to the front feeler element 94 since it is this means which encounters the majority of the uneven ground, the rear feeler element 54 passing over an area already leveled by the scraper 20. However, it is to be understood that a wheel means such as 110 can be substituted for the front feeler wheel 98 or the rear feeler wheel 56, or both.

In addition to reducing the height of the irregularities formed, it will also be seen that the modified construction shown in FIGURES 6–9 increases the accuracy and efficiency of the land leveler by lengthening the feeler elements. However, the turning radius is not increased since the arm member 113 will rotate about the vertical pivot member 123 to a substantially crosswise relationship with respect to the front feeler element 94 as soon as a turn is started thereby foreshortening the element extending from the driving means and facilitating the turning operation.

Although the modified construction has been shown in the drawings as useful with a land leveler such as disclosed in my copending application Serial No. 275,138 filed April 23, 1963, it will be readily seen that this improvement will also be advantageous in other land levelers such as, for example, those shown in my earlier Patent Nos. 3,034,239 and 3,103,078.

It will now be seen that there is herein provided an improved land leveler or the like which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative and not in a limiting sense.

I claim:

1. A land leveler having forwardly and rearwardly extending feeler elements, ground engaging wheel means carried by each feeler element, earth leveling means carried by said land leveler, and means for controlling said earth leveling means in response to vertical movement of said ground engaging wheel means, at least one of said ground engaging wheel means comprising a vertical pivot carried adjacent the end of its associated feeler element, a yoke depending from said pivot, a horizontally pivoted arm carried by said yoke, a slot at one end of said arm, an axle extending across said slot, a first wheel rotatably mounted on said axle, a second vertical pivot at the other end of said arm, a bifurcated swivel bracket secured to said second vertical pivot in depending relation, a second axle extending transversely between the bifurcations of said bracket, and a second wheel rotatably mounted on said second axle.

2. The structure of claim 1 wherein said at least one of said ground engaging wheel means is the wheel means carried by the forwardly extending feeler element.

References Cited by the Examiner

UNITED STATES PATENTS

| | | | |
|---|---|---|---|
| 949,071 | 2/1910 | Helmke | 280—104.5 |
| 2,886,906 | 5/1959 | Moses | 37—146 |
| 2,994,977 | 8/1961 | Shumaker et al. | 37—153 |
| 3,034,239 | 5/1962 | Waterson | 37—180 |
| 3,052,997 | 9/1962 | Holland | 37—156 X |
| 3,126,655 | 3/1964 | Fischer | 37—159 |

ABRAHAM G. STONE, *Primary Examiner.*

JOE O. BOLT, JR., WILLIAM A. SMITH III,
*Examiners.*